US011006568B2

(12) United States Patent
Yin et al.

(10) Patent No.: US 11,006,568 B2
(45) Date of Patent: May 18, 2021

(54) MOBILE OPERATING PLATFORM FOR PADDY FIELD

(71) Applicants: Shandong University of Technology, Zibo (CN); NANJING RESEARCH INSTITUTE FOR AGRICULTURAL MECHANIZATION, MINISTRY OF AGRICULTURE, Nanjing (CN)

(72) Inventors: Xiang Yin, Zibo (CN); Juan Du, Zibo (CN); Mingqun Yu, Zibo (CN); Ting'en Wang, Zibo (CN); Chengqian Jin, Zibo (CN); Duanyang Geng, Zibo (CN)

(73) Assignees: SHANDONG UNIVERSITY OF TECHNOLOGY, Zibo (CN); NANJING RESEARCH INSTITUTE FOR AGRICULTURAL MECHANIZATION, MINISTRY OF AGRICULTURE, Nanjing (CN)

( * ) Notice: Subject to any disclaimer, the term of this patent is extended or adjusted under 35 U.S.C. 154(b) by 17 days.

(21) Appl. No.: 16/743,998

(22) Filed: Jan. 15, 2020

(65) Prior Publication Data
US 2021/0084809 A1 Mar. 25, 2021

(30) Foreign Application Priority Data
Sep. 20, 2019 (CN) .......................... 201910891510.5

(51) Int. Cl.
*B63H 11/04* (2006.01)
*A01C 11/00* (2006.01)

(52) U.S. Cl.
CPC ............ *A01C 11/003* (2013.01); *B63H 11/04* (2013.01)

(58) Field of Classification Search
CPC ............................. A01C 11/003; B63H 11/04
See application file for complete search history.

(56) References Cited

U.S. PATENT DOCUMENTS 4,289,214 A * 9/1981 Spence ................. B60F 3/0007
180/234

* cited by examiner

*Primary Examiner* — S. Joseph Morano
*Assistant Examiner* — Jovon E Hayes
(74) *Attorney, Agent, or Firm* — Flener IP & Business Law; Zareefa B. Flener

(57) ABSTRACT

The present invention discloses a mobile operating platform for a paddy field, including a body, a power generating device, a movement control system, a draft control system and an automatic leveling system, where the power generating device, the movement control system, the draft control system and the automatic leveling system are all mounted on the body. The present invention has a compact overall structure, and utilizes the pressure of a water flow to realize the movement of the platform, and can fully utilize the characteristics of the water flow to reduce power consumption, and avoid the use of a heavy and complicated traditional walking device, the entire mobile operating platform for a paddy field does not contact the ground, saving mechanical power and avoiding damage to an aquatic crop; the draft control system adjusts a draft by the amount of water filled in a closed cavity in the body.

8 Claims, 3 Drawing Sheets

MOBILE OPERATING PLATFORM FOR PADDY FIELD

CROSS-REFERENCE TO RELATED APPLICATION

This application claims priority to Chinese Patent Application No. 201910891510.5 filed on Sep. 20, 2019, the disclosure of which is incorporated by reference herein in its entirety.

TECHNICAL FIELD

The present invention relates to the field of paddy field agricultural machinery, and in particular, to a mobile operating platform for a paddy field.

BACKGROUND

Compared with agricultural operations in dry fields, paddy field operations face a large depth to plow and are difficult to walk on the ground. Especially for paddy field operations such as lotus root planting and aquaculture in deeper waters, it is necessary to overcome the strong resistance of the ground and water. At present, wheeled machinery and crawler machinery are used to perform paddy field operations; however, the existing wheeled machinery and crawler machinery often have large and complicated structures, which are not only easy to cause damage to aquatic crops, but also have high requirements for the depth of the waters, resulting in a limitation to the range of use, as well as low operation safety, and poor operation quality.

SUMMARY

An objective of the present invention is to provide a mobile operating platform for a paddy field, which has a simple and compact structure, an adjustable moving speed, and an adjustable draft, and can provide a movable carrier for a paddy field operating tool and working part.

To achieve the above purpose, the present invention provides the following technical solution:

The present invention provides a mobile operating platform for a paddy field, comprising: a body, comprising a mounting plate and a bottom case mounted under the mounting plate upside down, wherein a closed cavity is formed between the mounting plate and the bottom case;

a power generating device, comprising a water distributor, a water pump, and an engine connected to the water pump, wherein a water outlet of the water pump is connected to the water distributor by a pipe, and the water distributor is disposed above the mounting plate;

a movement control system, comprising a movement controller and a plurality of horizontal nozzles connected to the water distributor respectively through a horizontal nozzle connecting pipe, wherein the plurality of horizontal nozzles are uniformly distributed around the body; each of the horizontal nozzle connecting pipes is provided with a first electric water valve, and each of the first electric water valves is connected to the movement controller through a signal;

a draft control system, comprising a draft controller, a draft sensor, a water suction pump, and a water injection pipe, wherein the draft sensor is fixedly mounted on the mounting plate and vertically inserted into water; the water injection pipe is used to connect the closed cavity with the water distributor, and the water injection pipe is provided with a water injection electric water valve; the water suction pump is mounted on the mounting plate; a water inlet of the water suction pump communicates with the interior of the closed cavity through a water suction pipe, and a water outlet of the water suction pump is connected with a water discharge pipe; the draft sensor, the water suction pump and the water injection electric water valve are all connected to the draft controller through a signal; and an automatic leveling system, comprising a level controller, an attitude sensor, and a plurality of vertical nozzles connected to the water distributor through a vertical nozzle connecting pipe, wherein the plurality of vertical nozzles are uniformly distributed around the body; each of the vertical nozzle connecting pipes is provided with a second electric water valve; the attitude sensor and each of the second electric water valves are connected to the level controller through a signal; wherein the engine, the water pump, the movement controller, the draft controller, the water suction pump, the level controller and the attitude sensor are all mounted on the mounting plate.

Optionally, the mounting plate is a circular mounting plate, and the bottom case is a hemispherical bottom case.

Optionally, the water distributor is a cylindrical water distributor, and a side wall of the cylindrical water distributor is provided with a plurality of outlet manifolds; the cylindrical water distributor is supported above the mounting plate by a bracket; the water outlet of the water pump, the water injection pipe, each of the horizontal nozzle connecting pipes, and each of the vertical nozzle connecting pipes are respectively connected to an outlet manifold.

Optionally, the water inlet of the water pump is connected to an inlet pipe, and a water inlet end of the inlet pipe is vertically inserted into water.

Optionally, 4 horizontal nozzles are provided, and the 4 horizontal nozzles are symmetrically distributed on an outer periphery of the mounting plate.

Optionally, 4 vertical nozzles are provided; the 4 vertical nozzles are symmetrically distributed on an outer periphery of the mounting plate, and each of the vertical nozzles is disposed alternately with each of the horizontal nozzles.

Optionally, the water injection electric water valve, each of the first electric water valves, and each of the second electric water valves are respectively mounted on a corresponding outlet manifold.

Optionally, the mounting plate is provided with a control box, and the movement controller, the draft controller, the level controller and the attitude sensor are all mounted in the control box.

Compared with the prior art, the present invention achieves the following technical effects.

The mobile operating platform for a paddy field of the present invention utilizes the pressure of a water flow to realize the movement of the platform, and can fully utilize the characteristics of the water flow to reduce power consumption, and avoid the use of a heavy and complicated traditional walking device, so that the entire mobile operating platform for a paddy field does not contact the ground, saving mechanical power and avoiding damage to an aquatic crop; a draft control system adjusts a draft by the amount of water filled in a closed cavity, so that the platform meets the requirement of operation at different depths of water, enhancing the versatility and universality of the platform; an automatic leveling system keeps the platform always in a level condition by a vertical impulse of the water flow, which greatly guarantees the operation safety and quality.

It can be seen that, the present invention not only can adjust the moving speed, the moving direction, and the draft, but also can keep the platform level; at the same time, a symmetrical structure of a circular mounting plate and a hemispherical bottom case makes the overall structure of the platform compact, and facilitates the platform to bear uniform forces in all directions in water, which improves the platform's trafficability and mobility, and has strong practicability.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other accompanying drawings from these accompanying drawings without creative efforts.

Figure 1:
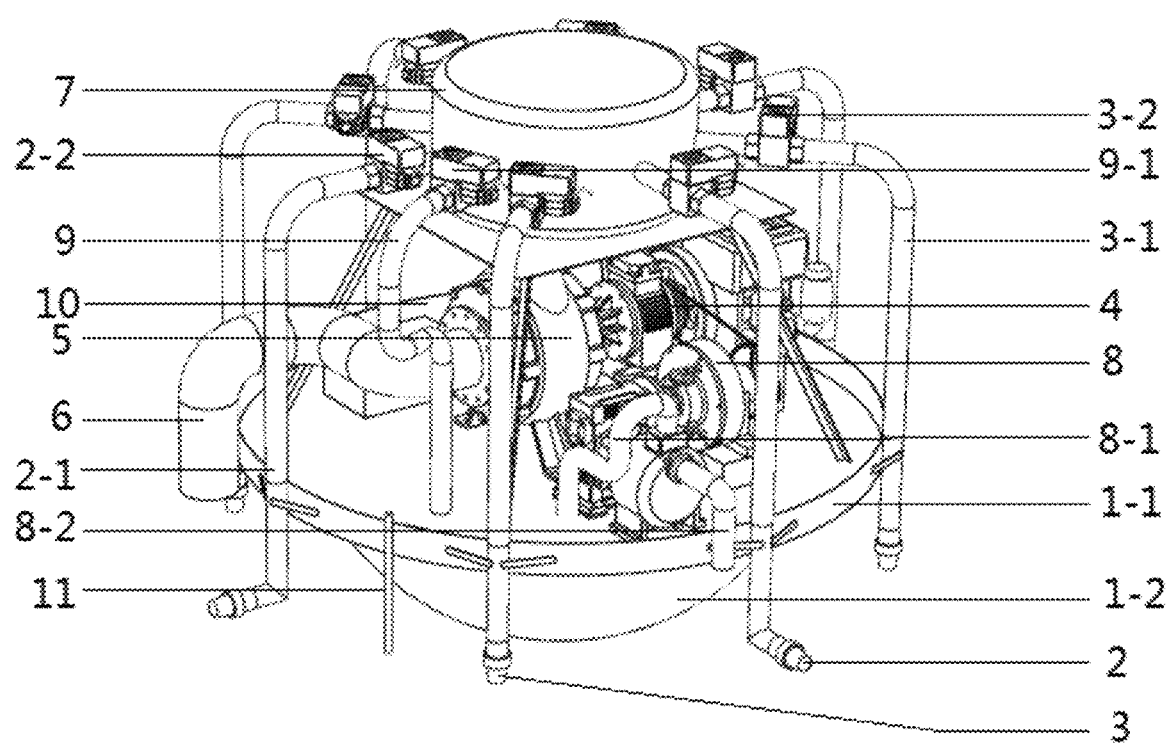
FIG. 1 is a schematic structural diagram of an overall mobile operating platform for a paddy field according to the present invention.

Where, the reference numbers are: 1. body; 1-1. mounting plate; 1-2. bottom case; 2. horizontal nozzle; 2-1. horizontal nozzle connecting pipe; 2-2. first electric water valve; 3 vertical nozzle; 3-1. vertical nozzle connecting pipe; 3-2. second electric water valve; 4. engine; 5. water pump; 6. inlet pipe; 7. water distributor; 7-1. outlet manifold; 7-2. bracket; 8. water suction pump; 8-1. water suction pipe; 8-2. water discharge pipe; 9. water injection pipe; 9-1. water injection electric water valve; 10. control box; and 11. draft sensor.

DETAILED DESCRIPTION

The following clearly and completely describes the technical solutions in the embodiments of the present invention with reference to accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a mobile operating platform for a paddy field, which has a simple and compact structure, an adjustable moving speed, and an adjustable draft, and can provide a movable carrier for a paddy field operating tool and working part.

Based on this, the present invention provides a mobile operating platform for a paddy field, including:

a body, including a mounting plate and a bottom case mounted under the mounting plate upside down, where a closed cavity is formed between the mounting plate and the bottom case;

a power generating device, including a water distributor, a water pump, and an engine connected to the water pump, where a water outlet of the water pump is connected to the water distributor by a pipe, and the water distributor is disposed above the mounting plate;

a movement control system, including a movement controller and a plurality of horizontal nozzles connected to the water distributor respectively through a horizontal nozzle connecting pipe, where the plurality of horizontal nozzles are uniformly distributed around the body; each horizontal nozzle connecting pipe is provided with a first electric water valve, and each first electric water valve is connected to the movement controller through a signal;

a draft control system, including a draft controller, a draft sensor, a water suction pump, and a water injection pipe, where the draft sensor is fixedly mounted on the mounting plate and vertically inserted into water; the water injection pipe is used to connect the closed cavity with the water distributor, and the water injection pipe is provided with a water injection electric water valve; the water suction pump is mounted on the mounting plate, and the water suction pump communicates with the interior of the closed cavity through a water suction pipe; the draft sensor, the water suction pump and the water injection electric water valve are all connected to the draft controller through a signal; and an automatic leveling system, including a level controller, an attitude sensor, and a plurality of vertical nozzles connected to the water distributor through a vertical nozzle connecting pipe, where the plurality of vertical nozzles are uniformly distributed around the body; each vertical nozzle connecting pipe is provided with a second electric water valve; the attitude sensor and each second electric water valve are connected to the level controller through a signal;

the engine, the water pump, the movement controller, the draft controller, the water suction pump, the level controller and the attitude sensor are all mounted on the mounting plate.

The mobile operating platform for a paddy field of the present invention utilizes the pressure of a water flow to realize the movement of the platform, and can fully utilize the characteristics of the water flow to reduce power consumption, and avoid the use of a heavy and complicated traditional walking device, so that the entire mobile operating platform for a paddy field does not contact the ground, saving mechanical power and avoiding damage to an aquatic crop; the draft control system adjusts a draft by the amount of water filled in the closed cavity, so that the platform meets the requirement of operation at different depths of water, enhancing the versatility and universality of the platform; the automatic leveling system keeps the platform always in a level condition by a vertical impulse of the water flow, which greatly guarantees the operation safety and quality.

In order to make the above objectives, features, and advantages of the present invention more apparent and comprehensible, the present invention is described in more detail below with reference to the accompanying drawings and specific implementations.

Embodiment 1

Figure 2:
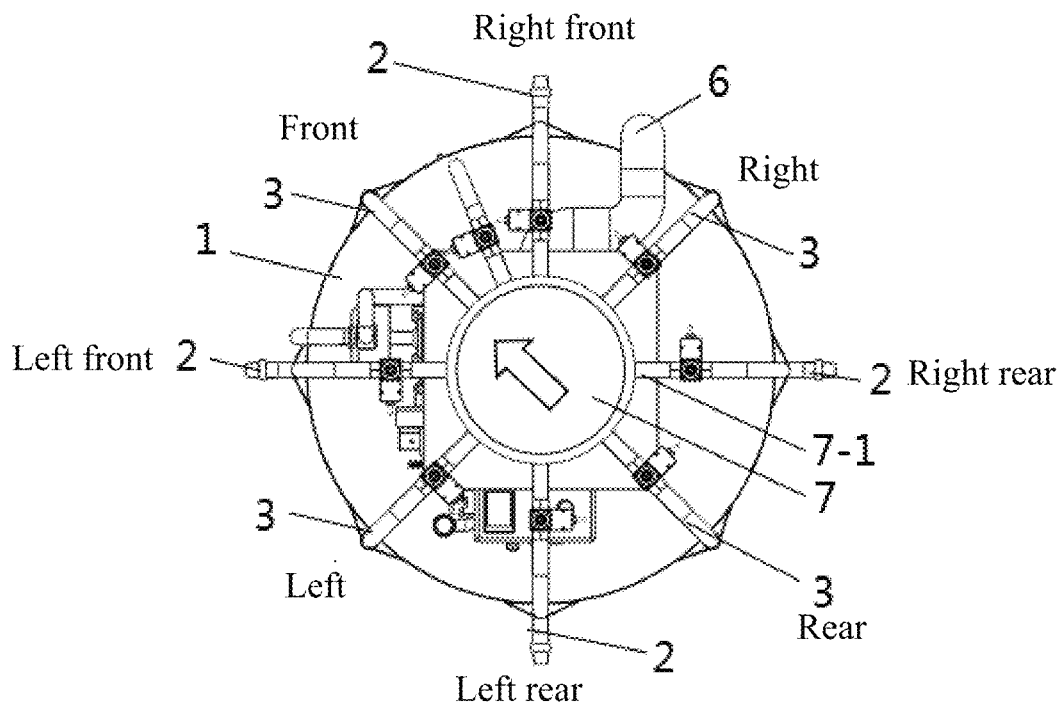
FIG. 2 is a top view of an overall mobile operating platform for a paddy field according to the present invention.

As shown in FIG. 1 to FIG. 2, the present embodiment provides a mobile operating platform for a paddy field, including a body 1, the body 1 including a mounting plate 1-1 and a bottom case 1-2 mounted under the mounting plate 1-1 upside down, where a closed cavity is formed between the mounting plate 1-1 and the bottom case 1-2;

a power generating device, including a water distributor 7, a water pump 5, and an engine 4 connected to the water pump 5, where a water outlet of the water pump is 5 connected to the water distributor 7 by a pipe, and the water distributor 7 is disposed above the mounting plate 1-1; driven by the engine 4, the water pump 5 can suck a water flow through an inlet pipe 6, pressurize the water flow, and send the water flow into the water distributor 7;

a movement control system, including a movement controller and a plurality of horizontal nozzles 2 connected to the water distributor 7 respectively through a horizontal nozzle connecting pipe 2-1; the plurality of horizontal nozzles 2 are uniformly distributed around the body 1; each horizontal nozzle connecting pipe 2-1 is provided with a first electric water valve 2-2, and each first electric water valve 2-2 is connected to the movement controller through a signal; the movement controller can individually control the opening degree and opening and closing of each first electric water valve 2-2, so as to control the discharge flow and flow rate of each horizontal nozzle 2; in this embodiment, each horizontal nozzle 2 is horizontally disposed, and discharges water in a horizontal direction and along a radial direction of the body 1; the number of the horizontal nozzles 2 is at least 3 to meet the requirements of platform movement and turning;

a draft control system, including a draft controller, a draft sensor 11, a water suction pump 8, and a water injection pipe 9, where the draft sensor 11 is fixedly mounted on an outer side wall of the mounting plate 1-1 and is used to vertically insert into water; the water injection pipe 9 is used to connect the closed cavity with the water distributor 7, and the water injection pipe 9 is provided with a water injection electric water valve 9-1; the water suction pump 8 is mounted on the mounting plate 1-1; a water inlet of the water suction pump 8 communicates with the interior of the closed cavity through a water suction pipe 8-1, and a water outlet of the water suction pipe 8 is further connected with a water discharge pipe 8-2; the water discharge pipe 8-2 is used to discharge water in the closed cavity into a paddy field; the draft sensor 11, the water suction pump 8 and the water injection electric water valve 9-1 are all connected to the draft controller through a signal; the draft controller is used to control the start and stop of the water suction pump 8 and the opening and closing of the water injection electric water valve 9-1 according to an operation set value and a draft value detected by the draft sensor 11; when the draft value is greater than the operation set value, the draft controller controls the injection electric water valve 9-1 to be closed, and starts the water suction pump 8 to pump out water in the closed cavity through the water suction pipe 8-1, so that the weight of the platform is reduced, and the body 1 floats upward; when the draft value is less than the operation set value, the draft controller controls the water suction pump 8 to be closed and turns on the water injection electric water valve 9-1 to inject water into the closed cavity, so that the weight of the platform is increased, and the body 1 submerges; the draft controller controls the filling and discharging of water in the closed cavity to adjust a draft, so that the platform meets the requirement of operation at different depths of water, thereby enhancing the versatility and universality of the platform; and an automatic leveling system, including a level controller, an attitude sensor, and a plurality of vertical nozzles 3 connected to the water distributor 7 through a vertical nozzle connecting pipe 3-1, where the plurality of vertical nozzles 3 are uniformly distributed around the body 1; each vertical nozzle connecting pipe 3-1 is provided with a second electric water valve 3-2; the attitude sensor is used to acquire attitude data of the body 1; the attitude sensor and each second electric water valve 3-2 are connected to the level controller through a signal; the water flow direction of each vertical nozzle 3 is vertical downward; the level controller can individually control the opening degree and opening and closing of each second electric water valve 3-2, so as to realize the control of the discharge flow and discharge flow rate of each vertical nozzle 3; in this embodiment, the number of the vertical nozzles 3 is at least 3, so as to meet the requirement of the level adjustment of the body 1;

in this embodiment, the engine 4, the water pump 5, the movement controller, the draft controller, the water suction pump 8, the level controller and the attitude sensor are all mounted on the mounting plate 1-1.

Further, as shown in FIG. 1, in this embodiment, the mounting plate 1-1 is preferably a circular mounting plate, and the bottom case 1-2 is preferably a hemispherical bottom case; correspondingly, the closed cavity between the mounting plate 1-1 and the hemispherical bottom case is a hemispherical closed space, and the closed cavity is used as a water tank; the body 1 is designed as the above-mentioned circular symmetrical structure, which can make the overall structure of the platform compact, and make forces the platform bear uniform in all directions in the water, which improves the platform's trafficability and mobility.

Further, as shown in FIG. 1 to FIG. 2, in this embodiment, the water distributor 7 is preferably a cylindrical water distributor, and a side wall of the cylindrical water distributor is provided with a plurality of outlet manifolds 7-1; the cylindrical water distributor is supported above the mounting plate 1-1 by a bracket 7-2; a space between the bracket 7-2 and the mounting plate 1-1 is a mounting space for other components; the water outlet of the water pump 5, the water injection pipe 9, each horizontal nozzle connecting pipe 2-1, and each vertical nozzle connecting pipe 3-1 are respectively connected to an outlet manifold 7-1; the water distributor 7 distributes an internal liquid to each outlet manifold 7-1, and the outlet manifold 7-1 delivers the water to the water pump 5, the water injection pipe 9, each horizontal nozzle connecting pipe 2-1, and each vertical nozzle connecting pipe 3-1.

Further, as shown in FIG. 1, in this embodiment, the water inlet of the water pump 5 is connected to an inlet pipe 6, and a water inlet end of the inlet pipe 6 is vertically inserted into water, so that when the amount of water in the water distributor 7 is insufficient, the inlet pipe 6 directly sucks water up from a paddy field into the water pump 5.

Further, as shown in FIG. 1 to FIG. 2, in this embodiment, preferably 4 horizontal nozzles 2 are provided, and the 4 horizontal nozzles 2 are symmetrically distributed on an outer periphery of the mounting plate 1-1. As shown in FIG. 2, the 4 horizontal nozzles 2 are disposed in the left front, right front, left rear and right rear directions of the body 1, respectively, and discharge water in a horizontal direction; a forward direction of the body 1 is shown by an arrow in FIG. 2. When the platform needs to move forward, first electric water valves 2-2 of a left front horizontal nozzle and a right front horizontal nozzle are closed simultaneously, and first electric water valves 2-2 of a left rear horizontal nozzle and a right rear horizontal nozzle are opened simultaneously with the same opening degree under the control of the movement controller to achieve the same water flow of the left rear horizontal nozzle and the right rear horizontal nozzle; when the platform needs to move backward, the movement controller controls the first electric water valves 2-2 of the left front horizontal nozzle and the right front horizontal nozzle to open simultaneously with the same discharge flow, and at the same time, controls the first electric water valves 2-2 of the left rear horizontal nozzle and the right rear horizontal nozzle to close to stop the left rear horizontal nozzle and the right rear horizontal nozzle from discharging water; correspondingly, when the platform needs to translate to the left, the movement controller controls the first electric water valves 2-2 of the right front horizontal nozzle and the right rear horizontal nozzle to open simultaneously with the same discharge flow, and controls the first electric water valves 2-2 of the left front horizontal nozzle and the left rear horizontal nozzle to close; when the platform needs to translate to the right, the movement controller controls the first electric water valves 2-2 of the left front horizontal nozzle and the left rear horizontal nozzle to open simultaneously with the same discharge flow, and controls the first electric water valves 2-2 of the right front horizontal nozzle and the right rear horizontal nozzle to close; when the platform needs to turn clockwise, the movement controller controls the first electric water valves 2-2 to make the discharge flow of the left rear horizontal nozzle larger than the discharge flow of the right rear horizontal nozzle, and the larger a flow difference, the larger a rotational angular speed; when the platform needs to turn counterclockwise, the movement controller controls the first electric water valves 2-2 to make the discharge flow of the right rear horizontal nozzle larger than the discharge flow of the left rear horizontal nozzle, and the larger a flow difference, the larger a rotational angular speed.

Further, preferably 4 vertical nozzles 3 are provided; the 4 vertical nozzles 3 are symmetrically distributed on an outer periphery of the mounting plate 1-1, and each vertical nozzle 3 is disposed alternately with each horizontal nozzle 2. As shown in FIG. 2, the 4 vertical nozzles 3 are uniformly distributed on the front, back, left and right sides of the body 1, and form a double crossed distribution pattern with the 4 horizontal nozzles 2; when the body 1 leans forward, the movement controller controls a second electric water valve 3-2 to make the discharge flow of a vertical nozzle in the front larger than the discharge flow of a vertical nozzle in the rear, and the larger the forward lean, the larger the flow difference; similarly, when the body 1 leans backward, left or right, a corresponding second electric water valve 3-2 can be controlled to adjust the discharge flow of a corresponding vertical nozzle 3, thereby restoring the entire platform to a level condition by a vertical downward impulse of a water flow.

Further, as shown in FIG. 1 to FIG. 2, in this embodiment, preferably, the water injection electric water valve 9-1, each first electric water valve 2-2, and each second electric water valve 3-2 are respectively mounted on a corresponding outlet manifold 7-1.

Further, as shown in FIG. 1 to FIG. 2, in this embodiment, the mounting plate 1-1 is provided with a control box 10, and the movement controller, the draft controller, the level controller and the attitude sensor are all mounted in the control box 10, thereby improving the cleanliness of an upper surface of the mounting plate 1-1; the control box 10 is waterproof, and a corresponding signal wire of each controller inside is led out from the control box 10.

The working principle of this embodiment is described below.

Figure 3:
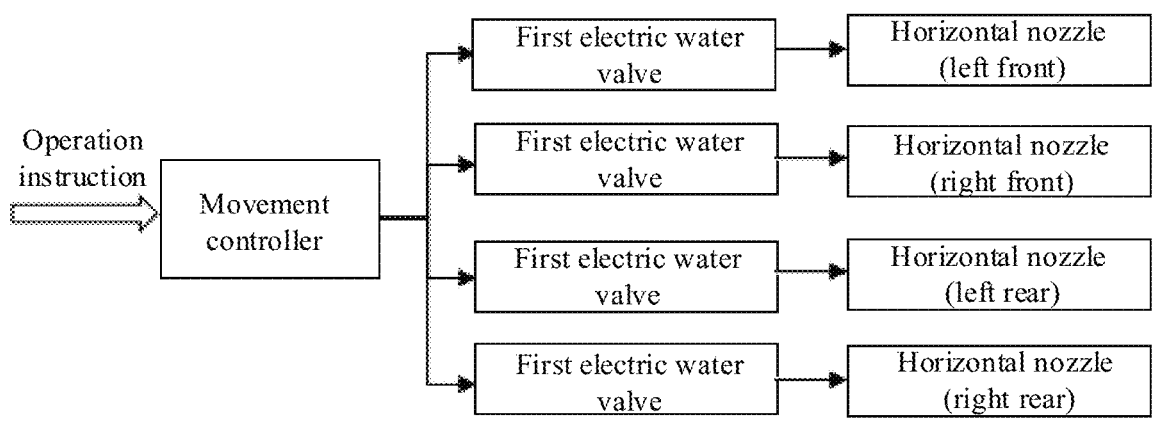
FIG. 3 shows a movement control system of a mobile operating platform for a paddy field according to the present invention.
Figure 4:
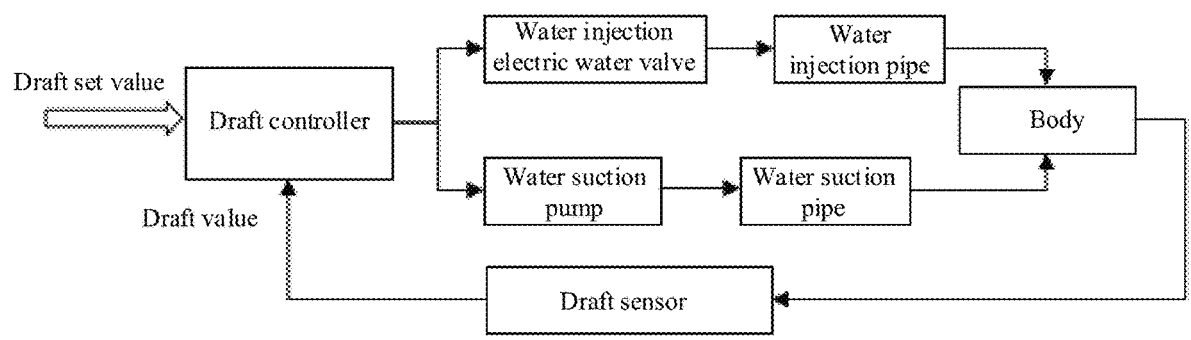
FIG. 4 shows a draft control system of a mobile operating platform for a paddy field according to the present invention.
Figure 5:
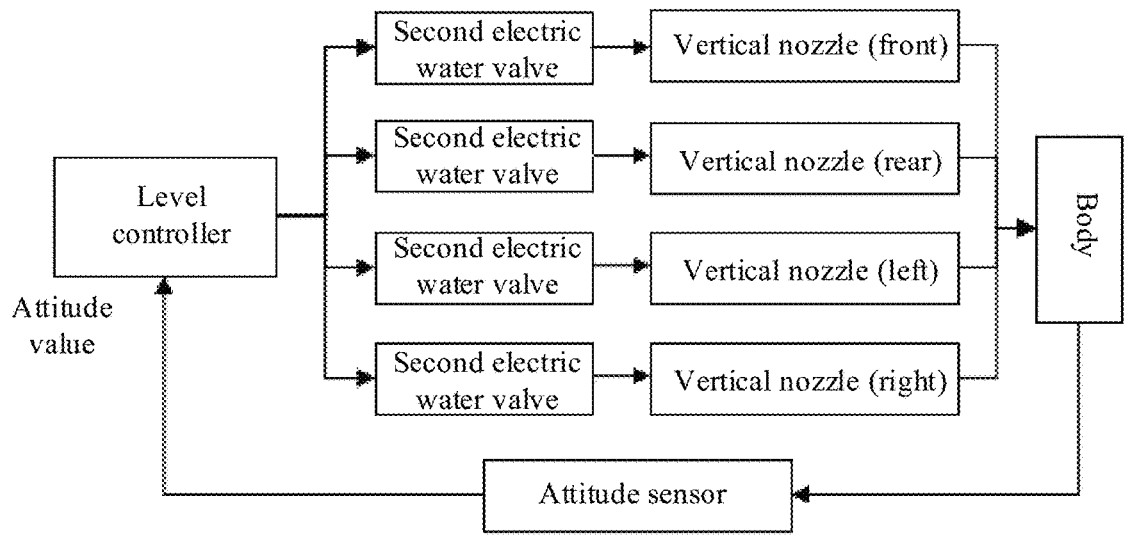
FIG. 5 is an automatic leveling control system of a mobile operating platform for a paddy field according to the present invention.

As shown in FIG. 3, the movement controller compares a speed set value and a speed measurement value of the attitude sensor, calculates, and independently adjusts the discharge flow of each horizontal nozzle 2, thereby changing the moving speed and moving direction of the platform. As shown in FIG. 4, the draft controller compares a set depth with a draft measured by the draft sensor 11; if the measured value is less than the set value, the water suction pump 8 is turned on to inject water in the water distributor 7 into the closed cavity in the body 1; if the measured value is larger than the set value, the water suction pump 8 is started to pump out water in the closed cavity into a paddy field. The level controller is used to read a measurement value of the attitude sensor, determine a lean state and angle of the platform in a three-dimensional space, and increase or decrease the discharge flow of each vertical nozzle 3 to adjust the lean angle of the platform in all directions by means of the vertical impulse of the water flow, and adjust the lean angle of the platform to be zero, thereby keeping the body level.

It can be seen that, the mobile operating platform for a paddy field of the present invention utilizes the pressure of the water flow to realize the movement of the platform, and can fully utilize the characteristics of the water flow to reduce power consumption, and avoid the use of a heavy and complicated traditional walking device, so that the entire mobile operating platform for a paddy field does not contact the ground, saving mechanical power and avoiding damage to an aquatic crop; the draft control system adjusts a draft by the amount of water filled in the closed cavity, so that the platform meets the requirement of operation at different depths of water, enhancing the versatility and universality of the platform; the automatic leveling system keeps the platform always in a level condition by a vertical impulse of the water flow, which greatly guarantees the operation safety and quality.

It can be seen that, the present invention not only can adjust the moving speed, the moving direction, and the draft, but also can keep the platform level; at the same time, the symmetrical structure of the circular mounting plate and the hemispherical bottom case makes the overall structure of the platform compact, and facilitates the platform to bear uniform forces in all directions in \water, which improves the platform's trafficability and mobility, and has strong practicability.

It should be noted that it is obvious to those skilled in the art that the present invention is not limited to the details of the above exemplary embodiments, and that the present invention can be implemented in other specific forms without departing from the spirit or basic features of the present invention. Therefore, the embodiments should be regarded as exemplary and non-limiting in every respect, and the scope of the present invention is defined by the appended claims rather than the above description, and all changes falling within the meaning and scope of equivalent elements of the claims should be included in the present invention, and any reference numbers in the claims should not be construed as a limitation to the claims involved.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the present invention.

What is claimed is:

1. A mobile operating platform for a paddy field, comprising:
    a body, comprising a mounting plate and a bottom case mounted under the mounting plate upside down, wherein a closed cavity is formed between the mounting plate and the bottom case;
    a power generating device, comprising a water distributor, a water pump, and an engine connected to the water pump, wherein a water outlet of the water pump is connected to the water distributor by a pipe, and the water distributor is disposed above the mounting plate;
    a movement control system, comprising a movement controller and a plurality of horizontal nozzles connected to the water distributor respectively through a horizontal nozzle connecting pipe, wherein the plurality of horizontal nozzles are uniformly distributed around the body; each of the horizontal nozzle connecting pipes is provided with a first electric water valve, and each of the first electric water valves is connected to the movement controller through a signal;
    a draft control system, comprising a draft controller, a draft sensor, a water suction pump, and a water injection pipe, wherein the draft sensor is fixedly mounted on the mounting plate and vertically inserted into water; the water injection pipe is used to connect the closed cavity with the water distributor, and the water injection pipe is provided with a water injection electric water valve; the water suction pump is mounted on the mounting plate; a water inlet of the water suction pump communicates with the interior of the closed cavity through a water suction pipe, and a water outlet of the water suction pump is connected with a water discharge pipe; the draft sensor, the water suction pump and the water injection electric water valve are all connected to the draft controller through a signal; and
    an automatic leveling system, comprising a level controller, an attitude sensor, and a plurality of vertical nozzles connected to the water distributor through a vertical nozzle connecting pipe, wherein the plurality of vertical nozzles are uniformly distributed around the body; each of the vertical nozzle connecting pipes is provided with a second electric water valve; the attitude sensor and each of the second electric water valves are connected to the level controller through a signal; wherein the engine, the water pump, the movement controller, the draft controller, the water suction pump, the level controller and the attitude sensor are all mounted on the mounting plate.

2. The mobile operating platform for a paddy field according to claim 1, wherein the mounting plate is a circular mounting plate, and the bottom case is a hemispherical bottom case.

3. The mobile operating platform for a paddy field according to claim 1, wherein the water distributor is a cylindrical water distributor, and a side wall of the cylindrical water distributor is provided with a plurality of outlet manifolds; the cylindrical water distributor is supported above the mounting plate by a bracket; the water outlet of the water pump, the water injection pipe, each of the horizontal nozzle connecting pipes, and each of the vertical nozzle connecting pipes are respectively connected to an outlet manifold.

4. The mobile operating platform for a paddy field according to claim 1, wherein the water inlet of the water pump is connected to an inlet pipe, and a water inlet end of the inlet pipe is vertically inserted into water.

5. The mobile operating platform for a paddy field according to claim 1, wherein 4 horizontal nozzles are provided, and the 4 horizontal nozzles are symmetrically distributed on an outer periphery of the mounting plate.

6. The mobile operating platform for a paddy field according to claim 5, wherein 4 vertical nozzles are provided; the 4 vertical nozzles are symmetrically distributed on an outer periphery of the mounting plate, and each of the vertical nozzles is disposed alternately with each of the horizontal nozzles.

7. The mobile operating platform for a paddy field according to claim 3, wherein the water injection electric water valve, each of the first electric water valves, and each of the second electric water valves are respectively mounted on a corresponding outlet manifold.

8. The mobile operating platform for a paddy field according to claim 1, wherein the mounting plate is provided with a control box, and the movement controller, the draft controller, the level controller and the attitude sensor are all mounted in the control box.

\* \* \* \* \*